United States Patent [19]

Conner

[11] Patent Number: 5,460,409
[45] Date of Patent: Oct. 24, 1995

[54] SAFETY ROOF LINER

[76] Inventor: Gary R. Conner, 12416 S. Ridge Ter., Midlothian, Va. 23112

[21] Appl. No.: 96,351

[22] Filed: Jul. 23, 1993

[51] Int. Cl.[6] .......................... B60R 21/06; B60R 21/13
[52] U.S. Cl. .................... 280/749; 280/756; 296/214; 160/327; 160/368.1
[58] Field of Search .................................. 280/748, 749, 280/756, 727; 296/214, 219, 102, 39.1; 160/327, 328, 370.2 R, 368.1, 354; 5/118, 120, 122

[56] References Cited

U.S. PATENT DOCUMENTS

| | | |
|---|---|---|
| 1,253,814 | 1/1918 | Grings .............................. 160/370.2 R |
| 2,001,136 | 5/1935 | Holderbach . |
| 2,586,262 | 2/1952 | Robins ....................................... 5/120 |
| 2,599,066 | 6/1952 | Osborn .............................. 160/370.2 R |
| 2,907,384 | 10/1959 | Spratt et al. ...................... 160/370.2 R |
| 3,037,809 | 6/1962 | Praha . |
| 3,252,732 | 5/1966 | Squier . |
| 3,638,992 | 2/1972 | Forshee . |
| 3,642,317 | 2/1972 | Swindlehurst . |
| 3,695,698 | 10/1972 | Trump . |
| 4,214,788 | 7/1980 | Srock . |
| 4,215,895 | 8/1980 | Phillips . |
| 4,406,320 | 9/1983 | Bingham .......................... 160/370.2 R |
| 4,475,764 | 10/1984 | Hutchinson et al. .................... 296/219 |
| 4,610,478 | 9/1986 | Tervol . |
| 4,840,832 | 6/1989 | Weinle et al. . |
| 4,923,211 | 5/1990 | Klose . |
| 4,957,797 | 9/1990 | Maeda et al. . |
| 4,958,878 | 9/1990 | Kempkers . |
| 4,992,320 | 2/1991 | Gower . |
| 5,007,976 | 4/1991 | Satterfield et al. . |
| 5,011,218 | 4/1991 | Danner et al. . |
| 5,026,231 | 6/1991 | Moore . |
| 5,170,521 | 12/1992 | Light ........................................... 5/118 |

FOREIGN PATENT DOCUMENTS 3217327  9/1991  Japan ..................................... 296/102

OTHER PUBLICATIONS

E. I. Du Pont de Nemours & Co. (Inc.), Characteristics and Uses of Kevlar® 49 Aramid High Modulus Organic Fiber, *Du Pont Technical Information: Fibers* K–5 (1981).
"Simpson Introduces New Safety Device," *Winston Cup Scene*, Oct. 22, 1992, p. 39.

*Primary Examiner*—Richard M. Camby
*Assistant Examiner*—Peter C. English
*Attorney, Agent, or Firm*—Bell, Seltzer, Park & Gibson

[57] ABSTRACT

A safety roof liner is disclosed which reduces the possibility of injury to a race car driver during a rollover accident. The safety roof liner comprises a generally rectangular sheet of high strength fabric material with front and rear edges, and opposite side edges. Each of a pair of straps manufactured from a high strength fabric material is attached along one of the opposite side edges and has a front end portion extending beyond the front edge of the sheet and a rear end portion extending beyond the rear edge. A releasable fastener, such as a slide adjuster, is used to fasten the end portions of the straps to the front and rear transverse braces of a roll cage in the race car. The rectangular sheet also has grommets transversely spaced apart along the front and rear edges of the sheet. The grommets are adapted to receive a separate fastening device such as a plastic tie wrap to further secure the safety roof liner to the roll cage. During a rollover accident where the roof is torn off, the safety roof liner as disclosed reduces the possibility of injury to the driver's extremities which may otherwise extend through the open roof of the race car.

16 Claims, 2 Drawing Sheets

SAFETY ROOF LINER

FIELD OF THE INVENTION

This invention relates to an improved roof liner for motor vehicles, and more particularly, to a safety roof liner for race cars and other motor vehicles used in racing.

BACKGROUND OF THE INVENTION

The sport of racing, including automobile racing as well as racing of other motor vehicles such as trucks, go-carts or "midget" racers, is a popular sport ranging from amateur to professional drivers. Unfortunately, accidents occur resulting in injury to the driver. One of the most dangerous accidents is when the automobile or other motor vehicle rolls over. Over the years, numerous safety features have been added to the motor vehicles in an attempt to prevent injury to the driver of the motor vehicle. Such safety features, including a roll cage or roll bar, have been installed in the race cars. However, in the case of a severe "rollover" accident, it often happens that the roof of the automobile or other motor vehicle is entirely or at least partially torn off. As a result, the driver's extremities, including arms and fingers, oftentimes protrude through the open roof of the race car or other motor vehicle. Protrusion of the extremities of the driver through the open roof of the race car during a rollover crash can result in serious injury to the driver.

Roof liners for motor vehicles have been suggested for a variety of purposes. For example, U.S. Pat. No. 2,001,136 to Holderbach entitled *Removable Wall Lining* provides a detachable wall lining constructed of a flexible, washable material which has a series of elastic or resilient loops stitched to the lining. Hooks are placed through the loops to secure the lining to the ceiling of the automobile. The lining of Holderbach is disposed over the driver's seat to protect the headwear of the driver from soiling when the headwear comes in contact with the ceiling of the vehicle.

Another example, U.S. Pat. No. 3,642,317 to Swindlehurst entitled *Vehicle Body Headlining*, provides a vehicle body headlining having lifting wires which are received in pockets of the headlining and clips which are preassembled to each lifting wire. The combination of the clips and the lifting wires are used to hold the headlining in a secure fashion against the interior of the vehicle.

A further example is provided by U.S. Pat. No. 3,252,732 to Squier entitled *Laminated Lining Material*. Squier provides a laminated lining material for lining the ceiling of vehicles which is manufactured from a laminate of kraft paperboard having a fused resin surface and a decorative material adhered thereto. The single piece laminate is snapped into position in the interior of the vehicle and assumes the configuration of the ceiling of the vehicle. Use of the roof liners provided by U.S. Pat. Nos. 2,001,136 to Holderbach, 3,642,317 to Swindlehurst, and 3,252,732 to Squier to prevent injury to the extremities of a driver during a rollover crash clearly would be unsatisfactory. None of these roof liners prevents the penetration of arms or fingers through the roof liner during a rollover accident. In addition, each roof liner is not adaptable to permit removable installation in different passenger compartments, or in association with different roll cages or other safety structural designs.

An example of a restraint device for a motor vehicle is U.S. Pat. No. 3,695,698 to Trump entitled *Restraint Device for Vehicle Cab Sleeper Bunk* which provides a restraint device in the form of a web-like harness constructed of flexible straps. The web-like harness is attached to the interior of the cab structure of a truck by quick release buckles. Similar to the examples noted above, use of the restraint device provided in U.S. Pat. No. 3,695,698 to Trump to prevent injury to a driver during a rollover crash is also unsatisfactory. Trump does not prevent the arms and fingers of the driver from extending through the harness during a rollover crash. Moreover, it is not adaptable to permit removable installation in different passenger compartments, or in association with different roll cages or other safety structural designs.

SUMMARY OF THE INVENTION

It is accordingly an object of the present invention to provide a safety roof liner for use in motor vehicles, and more particularly, race cars, which prevents the arms, fingers and other extremities of the driver from extending outside the motor vehicle during a rollover crash in which the roof of the motor vehicle is partially or entirely lost.

It is another object of this invention to provide a safety roof liner which reduces the possibility of injury to the driver of the motor vehicle during a rollover crash due to heat or fire.

It is a further object of this invention to provide a safety roof liner which is adaptable to permit easy installation in different passenger compartments, and for use in association with different roll cages and other safety structural designs.

These and other objects are provided in accordance with the present invention by a safety roof liner which can be removably mounted to a roll cage in a race car or other motor vehicle to retain the driver's extremities such as an arm or finger within the car during a rollover accident which results in the entire or partial loss of the car's roof. The roll cage provides a framework located within the race car which includes a front transverse brace and a rear transverse brace. The safety roof liner is formed from a generally rectangular sheet of high strength fabric material having front and rear edges and opposite longitudinal side edges. Each of a pair of high strength fabric straps are attached along the longitudinal side edges of the sheet such that each strap has a forward end portion extending longitudinally beyond the front edge of the sheet and a rear end portion extending longitudinally beyond the rear edge of the sheet. Releasable fastening means is attached to each of the forward and rear end portions of each strap to releasably fasten the sheet to the roll cage. This is accomplished by securing the forward end portions of the straps to the front brace of the roll cage using the releasable fastening means attached to the forward end portions of the straps and by securing the rear end portions of the straps to the rear brace of the roll cage using the releasable fastening means attached to the rear end portions of the straps.

The releasable fastening means preferably comprises a slide adjuster attached to the end portion of each strap. In addition, the fastening means may also comprise a first strip of hook-type filaments and a second strip of loop-type filaments, both of which are attached to the associated strap in a longitudinally spaced apart manner. The second strip is adapted to releasably engage the first strip when pressed against the first strip.

In addition, the safety roof liner according to the preferred embodiment of the present invention also comprises transversely spaced apart grommets which are mounted along the front and rear edges of the rectangular sheet of high strength fabric material. Each grommet, which is preferably manufactured from brass, is adapted to receive a separate fastening device, such as a plastic or nylon tie wrap, for further securing the sheet of high strength fabric material to the front and rear brace members of the roll cage.

In the preferred embodiment, the generally rectangular sheet of high strength fabric material and the straps are woven from yarns having both heat and fire resistant properties, such as yarns which consist essentially of aramid fibers.

BRIEF DESCRIPTION OF THE DRAWINGS

Some of the objects and advantages of the present invention having been stated, others will appear as the description proceeds, when taken in conjunction with the accompanying drawings which illustrate preferred embodiments of the invention, in which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
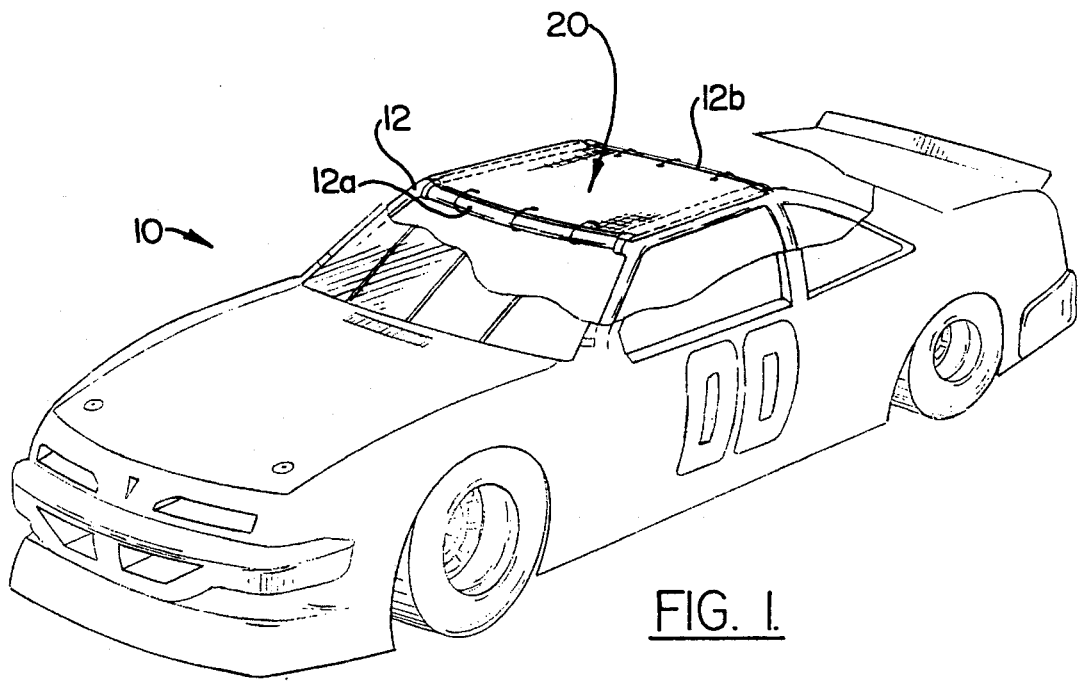
FIG. 1 is a cut-away view of a race car having a roll cage and showing the safety roof liner of the present invention removably fastened to the roll cage.

Referring to FIG. 1, the removable safety roof liner which embodies the features of the present invention will now be described. Race car 10, having roll cage 12 which provides a framework having a front transverse brace member and a rear transverse brace member, 12a and 12b, respectively, is illustrated. The safety roof liner, generally indicated at 20, is removably fastened to front transverse brace member 12a and rear transverse brace member 12b.

Figure 2:
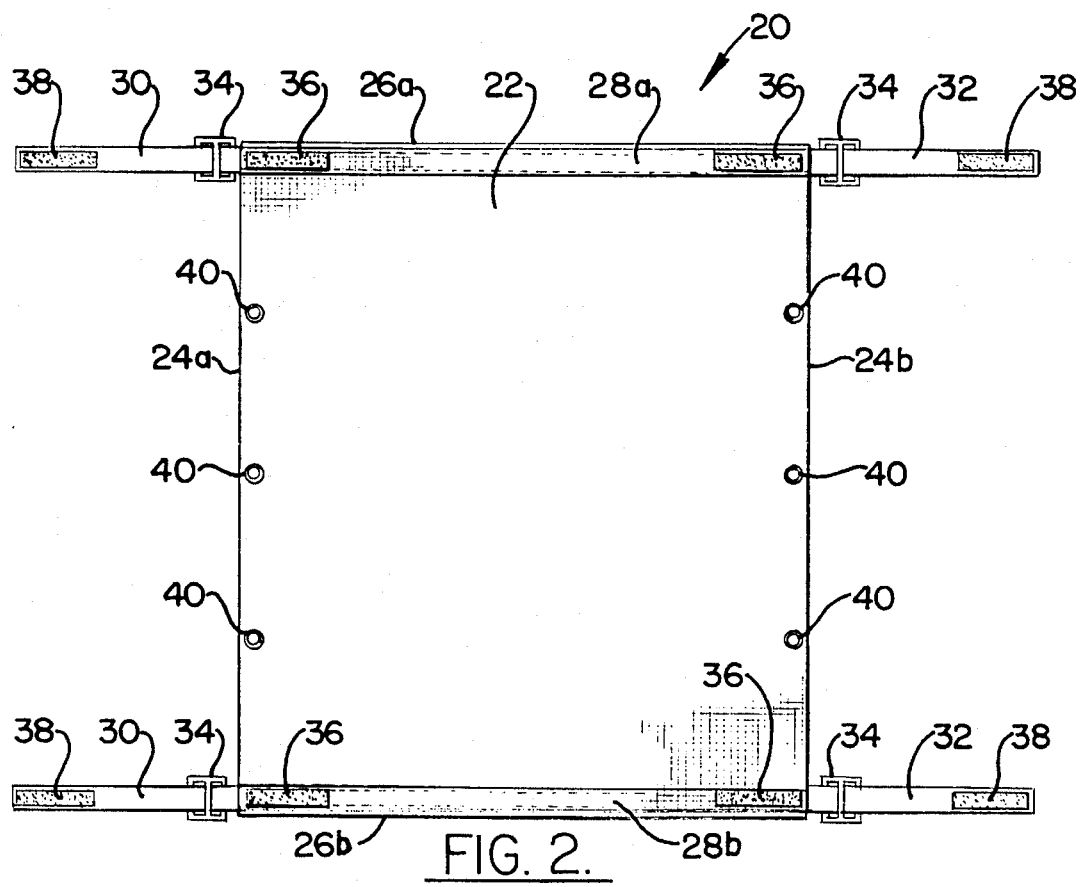
FIG. 2 is a bottom view of the safety roof liner shown removed from the roll cage.

Referring to FIG. 2, a bottom view of safety roof liner 20 is illustrated in more detail. Safety roof liner 20 is formed from a generally rectangular sheet of high strength fabric material 22 so as to provide an impenetrable barrier in order to maintain the extremities of the driver, including arms and fingers, within the race car or other motor vehicle during a rollover crash in which the roof is either partially or entirely lost. Rectangular sheet 22 defines front and rear edges 24a and 24b, and opposite longitudinal side edges 26a and 26b.

The safety roof liner 20 also has a pair of high strength fabric straps 28a and 28b which are attached by suitable stitching along longitudinal side edges 26a and 26b, respectively, of sheet 22. The high strength fabric straps 28a, 28b each have a forward end portion 30 which extends beyond the front edge 24a of sheet 22 and a rear end portion 32 which extends longitudinally beyond the rear edge 24b of sheet 22. Each strap 28a, 28b has releasable fastening means for releasably fastening the forward and rear end portions 30 and 32 of straps 28a, 28b to the front and rear transverse brace members 12a and 12b of roll cage 12.

In the preferred embodiment, the releasable fastening means includes a slide adjuster 34 attached to strap 28a, 28b and which receives the forward end portion 30 or rear end portion 32 of strap 28a or 28b once the associated end portion has been looped about the transverse brace member 12a or 12b of roll cage 12. The slide adjuster typically is a two-inch light duty metal slide adjuster which is capable of sliding along strap 28a or 28b to lengthen or shorten the reach of strap 28a or 28b depending on the distance between the front and rear transverse brace members 12a and 12b of roll cage 2.

Still referring to FIG. 2, a pair of hook and loop-type filament strips is provided at each forward and rear end portion 30 and 32 of straps 28a, 28b. The pair of hook and loop-type filament strips is formed by a first strip 36 of hook-type filaments which is attached to strap 28a or 28b and a second strip 38 of loop-type filaments which is also attached to strap 28a or 28b. The construction of such strips is well known, and strips of this type are commonly sold under the trademark Velcro®. During installation, once the forward end portion 30 or rear end portion 32 of straps 28a, 28b is looped about the front transverse brace member 12a or rear transverse brace member 12b, respectively, and the end portion is inserted through slide adjuster 34 fastening the sheet 22 to roll cage 12, the loop-type filament strip 38 is pressed against the hook-type filament strip 36 in order to hold the extra length of the end portion 30 or 32 and prevent it from "flapping."

It will be understood by those having skill in the art that the placement of the hook and loop-type filament strips 36 and 38 can be reversed. In addition, it will also be understood by those having skill in the art that any other type of releasable fastening means similar to a slide adjuster which permits sheet 22 to be adapted to different roll cages having varying distances between the front and rear transverse brace members 12a and 12b can be used. Such alternative releasable fastening means may include buckles, clips, snaps or even hook and loop-type filament strips by themselves. Still further, it will be understood by those having skill in the art that the safety roof liner according to the present invention can be installed in virtually any motor vehicle having a roof which provides a framework, even if the motor vehicle does not have a roll cage to define the framework.

In the preferred embodiment, sheet 22 is solid (without holes other than those defined by grommets 40) and is woven from yarns having both fire and heat resistant properties, such as yarns which consist essentially of aramid fibers. A typical material is that manufactured by Dupont and sold under the trademark Kevlar®. Sheet 22 has a transverse dimension of at least about 18 inches and a longitudinal dimension of at least about 18 inches which permits use of the safety roof liner in cars as small as midget race cars. The typical dimensions of sheet 22 for use in a full-size race car is a transverse dimension of about 42 inches and a longitudinal dimension of about 22 inches. In addition, although the weight of the sheet 22 may vary, it is preferably about between 17 and 22 ounces per square yard. Still further, a sheet of aluminized foil having a thickness of at least about 4 mil may be laminated to the top surface of sheet 22 to help reflect the heat from the interior of the motor vehicle.

Similar to sheet 22, straps 28a, 28b are also preferably woven from high strength yarns having heat and fire resistant properties, such as yarns which consist essentially of aramid fibers. Straps 28a, 28b, which preferably are about two inches in width, are attached by stitching to the longitudinal side edges 26a, 26b of the bottom surface of sheet 22 using at least about eight stitches per inch. Similar to sheet 22 and straps 28a, 28b, the thread used to stitch straps 28a, 28b to sheet 22 is also preferably woven from high strength yarns having heat and fire resistant properties, such as yarns consisting essentially of aramid fibers. It will be understood by those having skill in the art that other means, such as adhesives, may be used to attach straps 28a, 28b to sheet 22. In addition, straps 28a, 28b also preferably have a weight of about between 17 and 22 ounces per square yard.

Still referring to FIG. 2, safety roof liner 20 also has grommets 40 mounted along the front and rear edges, 24a and 24b, of sheet 22. In an alternative embodiment (see FIG. 4), grommets 40 also may be mounted along the longitudinal side edges 26a and 26b. Grommets 40, which are preferably manufactured from brass or a brass derivative, are mounted in a transversely spaced apart arrangement. A typical grommet which may be used is a "0" or "1" type grommet. The grommets are adapted to receive a separate device such as a nylon tie wrap having a serrated edge which is tightened by pulling the free end of the tie wrap through the opposite opened end of the tie wrap. By inserting the nylon tie wrap through grommets 40 and looping them about the front and rear transverse brace members 12a and 12b of roll cage 12, sheet 22 may be further secured in place in the race car or other motor vehicle. Nylon or plastic tie wraps (see 42 of FIG. 3) such as those commonly used for joining electrical cables may be used to further secure sheet 22 to the front and rear transverse braces of roll cage 12 by inserting them through grommets 40. It will be understood by those having skill in the art that any other type of fastening device which can be inserted through grommets 40 may be used to further secure sheet 22 to roll cage 12.

Figure 3:
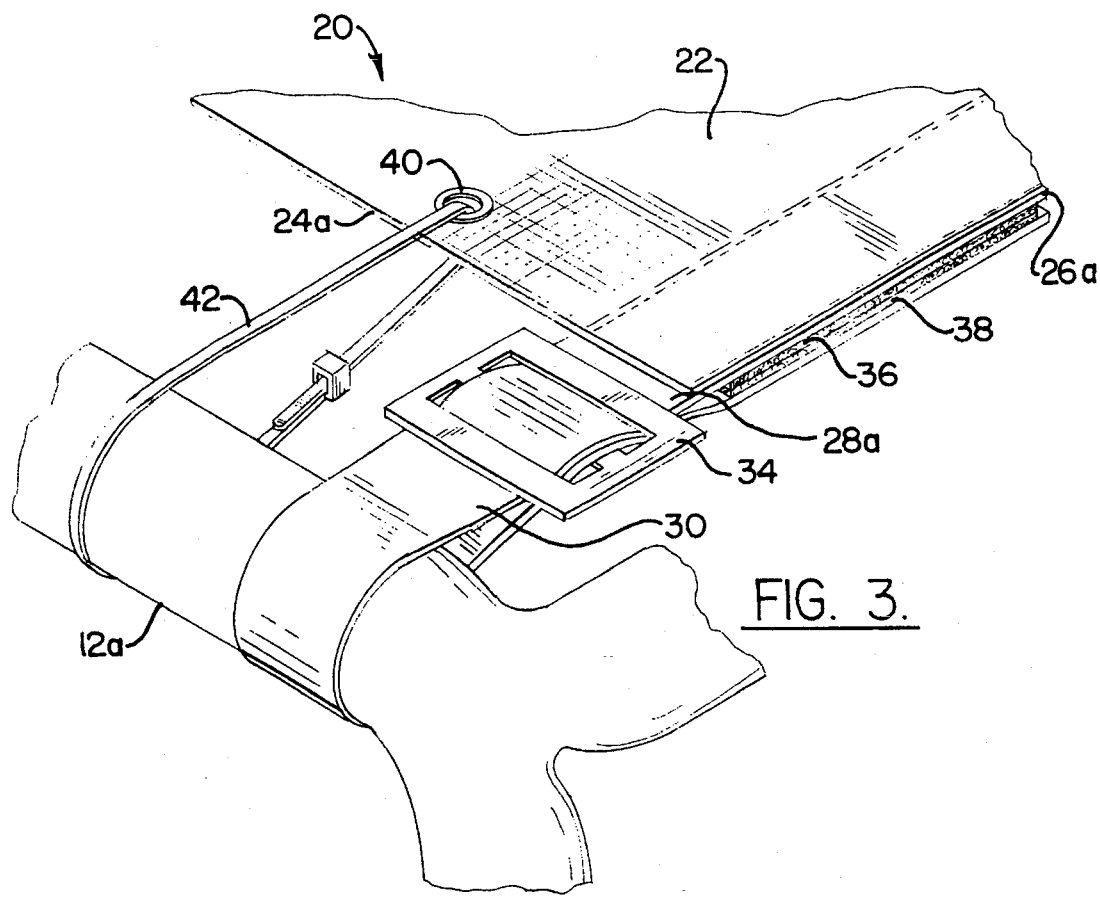
FIG. 3 is a fragmentary perspective view of the safety roof liner as seen in FIG. 1, and showing the safety roof liner removably fastened to the roll cage by a slide adjuster and a separate fastening device inserted through the grommet for further securing the sheet to the roll cage.

Referring to FIG. 3, a fragmentary perspective view of a portion of safety roof liner 20 according to the present invention is illustrated. Safety roof liner 20 having rectangular sheet 22, strap 28a stitched to the bottom surface of sheet 22 along longitudinal edge 26a with forward end portion 30 and grommet 40 along front edge 24a is shown. Safety roof liner 20 is removably installed by looping forward end portion 30 of strap 28a about front transverse brace member 12a and passing forward end portion 30 through slide adjuster 34. The extra loose end of forward end portion 30 which has a strip 38 of loop-type filament attached thereto is releasably engaged by pressing loop-type filament strip 38 against strip 36 of hook-type filaments which is also attached to strap 28a. In addition, to further secure front edge 24a of sheet 22 to the front transverse brace member 12a, a plastic tie wrap 42 is inserted through grommet 40, looped about the front transverse brace member 12a, and the free end of the plastic tie wrap is inserted through the open end of the plastic tie wrap.

In order to complete the installation of safety roof liner 20, the above process is repeated with respect to the remaining end portions 30 and 32 of straps 28a, 28b and grommets 40. It will be understood by those having skill in the art that safety roof liner 20 can be installed such that roof liner 20 is inverted with straps 28a, 28b facing up or is turned 90° with straps 28a, 28b running across the car and attaching to side brace members of roll cage 12. After use, safety roof liner 20 may be easily removed by releasing the hook and loop-type filament strips 36 and 38, removing the end portions 30 and 32 of straps 28a, 28b from slide adjusters 34, and simply cutting the plastic tie wraps 42.

Figure 4:
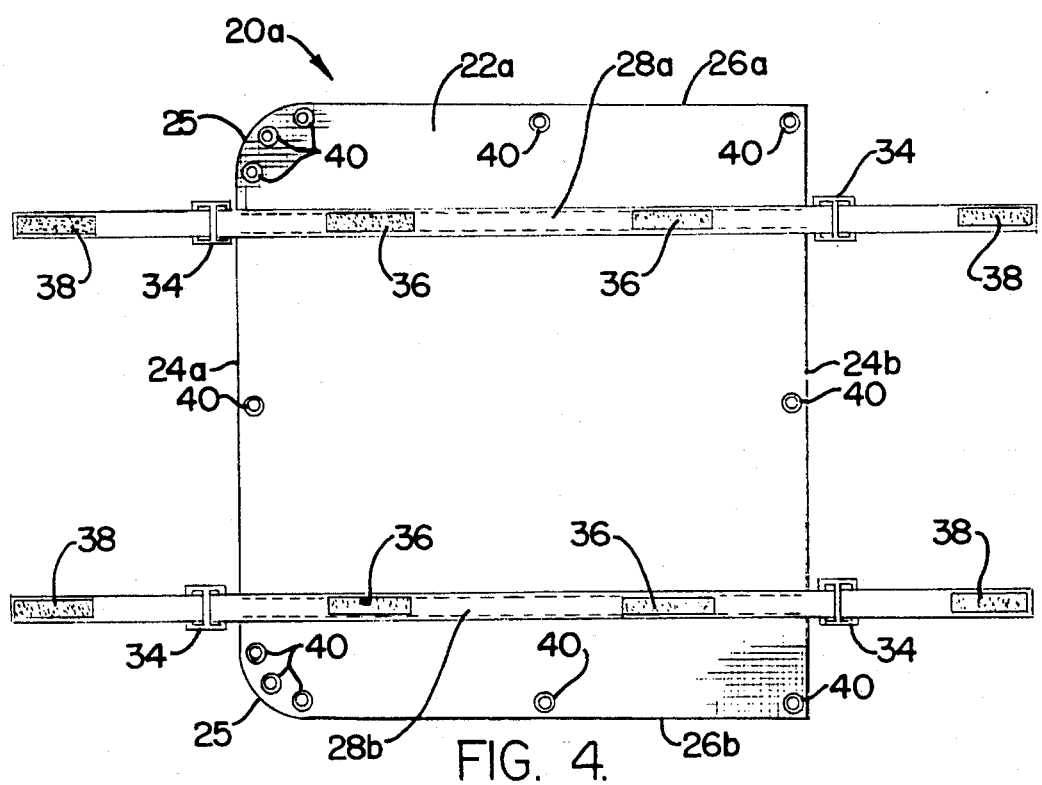
FIG. 4 is a bottom view of an alternative embodiment of the safety roof liner of the present invention.

Referring to FIG. 4, a bottom view of an alternative embodiment of the safety roof liner according to the present invention is illustrated. As in the embodiment illustrated in FIGS. 1–3, safety roof liner 20a is formed from a generally rectangular sheet 22a having front and rear edges 24a and 24b, and opposing longitudinal side edges 26a and 26b. Safety roof liner 20a also has a pair of straps 28a, 28b stitched to the bottom surface of sheet 22a approximately parallel to opposing longitudinal side edges 26a, 26b with slide adjusters 34 and hook and loop-type filament strips 36 and 38 attached to the straps, and grommets 40 spaced along front and rear edges 24a and 24b. The corners of the generally rectangular sheet 22a between the front edge 24a and longitudinal side edges 26a and 26b are rounded to define corner edges 25 to adapt safety roof liner 20a to a different design for ,a roll cage 12. In addition, grommets 40 are mounted along corner edges 25 and the longitudinal side edges 26a and 26b to receive separate fastener devices to further secure sheet 22a to roll cage 12.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A motor vehicle having provision to retain a passenger's extremities within the automobile in the event of a rollover comprising:

a motor vehicle frame which defines a passenger compartment which includes a pair of spaced apart transverse brace members located generally above the passenger compartment;

a generally rectangular sheet of a predetermined high strength substantially non-stretching fabric material, with the sheet defining front and rear edges which are disposed generally parallel to and adjacent said pair of spaced apart brace members, and opposite longitudinal side edges;

a pair of high strength substantially non-stretching and continuous fabric straps of high strength fabric material attached along respective ones of the longitudinal side edges of the sheet, with each of said straps having a forward end portion which extends longitudinally beyond the front edge of the sheet, and a rear end portion which extends longitudinally beyond the rear edge of the sheet, said forward end portion of each of said fabric straps looping about one of said transverse brace members, and said rear end portion of each of said fabric straps looping about the other of said transverse brace members;

fastening means attached to each of said forward and rear end portions of each of said substantially non-stretching straps and securing each of said forward and rear end portions to itself to thereby maintain the forward and rear end portions looped about the associated brace members;

such that the rectangular sheet, substantially non-stretching fabric straps and fastening means form a relatively rigid liner within the motor vehicle.

2. The motor vehicle as defined in claim 1 wherein said pair of spaced apart transverse brace members comprise a front transverse brace member and a rear transverse brace member.

3. The motor vehicle as defined in claim 1 further comprising a roll cage mounted to said motor vehicle frame and wherein said pair of brace members are components of said roll cage.

4. The motor vehicle as defined in claim 1 wherein each of said fastening means comprises a slide adjuster means attached to the end portion of the associated substantially non-stretching strap for releasably looping the end portion of the associated substantially non-stretching strap about the associated brace member.

5. The motor vehicle as defined in claim 4 wherein each of said fastening means further comprises a first strip of hook-type filaments and a second strip of loop-type filaments which is adapted to releasably engage said first strip when pressed thereagainst, with said first and second strips being attached to the associated substantially non-stretching strap in a longitudinally spaced apart arrangement.

6. The motor vehicle as defined in claim 4 wherein each slide adjuster means attached to the end portion of the associated substantially non-stretching strap comprises a two inch slide adjuster.

7. The motor vehicle as defined in claim 1 further comprising a plurality of transversely spaced apart grommets mounted along each of said front and rear edges of said sheet, and so that each grommet is adapted to receive a separate fastening device which is looped about the adjacent brace member for further securing the sheet to said pair of brace members.

8. The motor vehicle as defined in claim 7 wherein said grommets comprise brass grommets.

9. The motor vehicle as defined in claim 1 wherein said sheet of fabric material is composed essentially of aramid fibers.

10. The motor vehicle as defined in claim 1 wherein said sheet of fabric material is about between 17 and 22 ounces per square yard in weight.

11. The motor vehicle as defined in claim 1 wherein said sheet has a transverse dimension of at least about 18" and a longitudinal dimension of at least about 18".

12. The motor vehicle as defined in claim 1 wherein said each of said high strength substantially non-stretching straps is composed essentially of aramid fibers.

13. The motor vehicle as defined in claim 1 wherein each of said high strength substantially non-stretching straps is about two inches wide.

14. The motor vehicle as defined in claim 1 wherein each of said high strength substantially non-stretching straps is about between 17 and 22 ounces per square yard in weight.

15. The motor vehicle as defined in claim 1 wherein each of said high strength substantially non-stretching straps is attached along respective ones of the longitudinal edges of the sheet by stitching.

16. The motor vehicle as defined in claim 1 wherein said end portions of said substantially non-stretching straps are releasably fastened in a configuration looped about the associated brace members.

* * * * *

UNITED STATES PATENT AND TRADEMARK OFFICE
CERTIFICATE OF CORRECTION

PATENT NO.   :   5,460,409
DATED        :   October 24, 1995
INVENTOR(S)  :   Gary R. Conner It is certified that error appears in the above-identified patent and that said Letters Patent is hereby corrected as shown below:

Column 4, line 16, "2" should be -- 12 --.

Column 6, line 17, after "for " omit -- , --.

Signed and Sealed this

Nineteenth Day of March, 1996

Attest:

BRUCE LEHMAN

Attesting Officer       Commissioner of Patents and Trademarks

UNITED STATES PATENT AND TRADEMARK OFFICE
CERTIFICATE OF CORRECTION

PATENT NO. : 5,460,409
DATED : October 24, 1995
INVENTOR(S) : Gary R. Conner

It is certified that error appears in the above-indentified patent and that said Letters Patent is hereby corrected as shown below:

On cover page, insert item [73] to read as follows:
--Conner Race Products, Richmond, Virginia--

Signed and Sealed this

Seventh Day of May, 1996

Attest:

BRUCE LEHMAN

Attesting Officer

Commissioner of Patents and Trademarks